United States Patent [19]
Tseng et al.

[11] Patent Number: 6,006,780
[45] Date of Patent: Dec. 28, 1999

[54] TWO-STAGE, WARM-GAS HIGH PRESSURE REGULATOR

[75] Inventors: Raymond R. Tseng; Stephen G. Abel, both of Chandler, Ariz.

[73] Assignee: AlliedSignal Inc., Morristown, N.J.

[21] Appl. No.: 09/103,335

[22] Filed: Jun. 23, 1998

Related U.S. Application Data

[60] Provisional application No. 60/050,522, Jun. 23, 1997.

[51] Int. Cl.[6] .................................................. G05D 16/02
[52] U.S. Cl. .............. 137/488; 137/505.14; 137/505.15; 137/505.28
[58] Field of Search .............................. 137/488, 505.14, 137/505.15, 505.28

[56] References Cited

U.S. PATENT DOCUMENTS

| | | |
|---|---|---|
| 673,732 | 5/1901 | Shoemaker .......................... 137/505.28 |
| 2,601,439 | 6/1952 | Karig . |
| 2,891,569 | 6/1959 | Goodner . |
| 3,064,675 | 11/1962 | Johnson . |
| 3,246,669 | 4/1966 | Adams . |
| 3,456,681 | 7/1969 | Faisandier . |
| 4,197,877 | 4/1980 | Winiasz . |
| 4,250,913 | 2/1981 | Scull . |
| 4,664,137 | 5/1987 | Leorat et al. . |
| 5,103,861 | 4/1992 | Lin . |
| 5,186,208 | 2/1993 | Hansen . |
| 5,411,053 | 5/1995 | Markham et al. ................. 137/505.28 |
| 5,456,282 | 10/1995 | Whitehead . |
| 5,465,750 | 11/1995 | Wang . |
| 5,586,575 | 12/1996 | Bergamini et al. ...................... 137/488 |
| 5,735,308 | 4/1998 | Yokota et al. ........................... 137/488 |
| 5,787,925 | 8/1998 | Ollivier ............................... 137/505.14 |

*Primary Examiner*—Stephen M. Hepperle
*Attorney, Agent, or Firm*—Robert Desmond, Esq.

[57] ABSTRACT

A pneumatic regulating valve that operates on high-temperature, high-pressure gases. This invention reduces the upstream pressure of a flow of gas, which can be as high as 10,000 psia, down to a level usable by downstream control valves, which may require controlled pressure input. The springs and seals of this invention are isolated from the high temperature and pressure of the upstream gas, thus enabling regulation of gas flows of up to 10,000 psia and 2,500° F.

6 Claims, 7 Drawing Sheets

TWO-STAGE, WARM-GAS HIGH PRESSURE REGULATOR

This invention claims the priority of provisional application Ser. No. 60/050,522 filed Jun. 23, 1997.

BACKGROUND OF THE INVENTION

The present invention relates to pressure regulators, particularly to pressure regulators for regulation of a gas at high temperature and high pressure.

Pressure regulators of various types have been developed for a multitude of operating conditions. A conventional regulator requires that the pressure setting spring be immersed in the working fluid. This poses a problem for the warm-gas regulator design as no spring material can be exposed to temperatures of around 2,500° F. without losing its required mechanical properties. For instance, a silicon nitride spring can tolerate the high temperature, but is not adequate for higher-pressure applications because of its low shear strength and brittleness.

Other regulators also expose the dynamic seals in the main valve area to the pressure of the entering fluid. If pressure and temperature are high, for example approaching 10,000 psia and 2,500° F., the dynamic seals will be damaged.

The present invention allows for use of a spring in the pilot portion of a regulator for high-temperature, high-pressure applications through a novel design that protects the spring from exposure to the warm gas. This allows for the use of common spring materials, such as 17–7, in the design. It also isolates the dynamic seals of the main regulator from high temperature and pressure.

SUMMARY OF THE INVENTION

This novel warm gas regulator design includes a pilot regulator and a main regulator. The main regulator is designed so that the graphite dynamic seals will not be exposed to the inlet gas, which is at pressure as high as 10,000 psia and at temperature of 2,500° F. Dynamic seals that can tolerate 10,000 psia at 2,500° F. are not existing or not practical. Therefore, our invention limits the dynamic graphite seal exposure to lower pressure, such as 2,000 psia. Reducing the pressure to this level enables us to use a proven dynamic seal design and to reduce detrimental hysteresis from the friction.

The present invention also isolates the pilot spring from the fluid, reducing the effects of the temperature of the fluid on the spring.

To achieve a constant regulated output pressure, this main regulator design requires a special pilot pressure profile, which is met by our design.

It is an object of our invention to provide a pressure regulator that is capable of regulating a flow of a high-temperature, high-pressure gas.

It is a further object of our invention to provide a design whereby the spring of a pilot valve is not immersed in the fluid regulated and relatively unaffected by the temperature of the fluid.

It is a further object of our invention to provide a design whereby the seals of a main regulating valve are not exposed to extreme pressures.

Further objects and advantages of the invention will become apparent to those skilled in the art upon consideration of the drawings when considered in connection with the description herein.

DETAILED DESCRIPTION OF THE INVENTION

Figure 1:
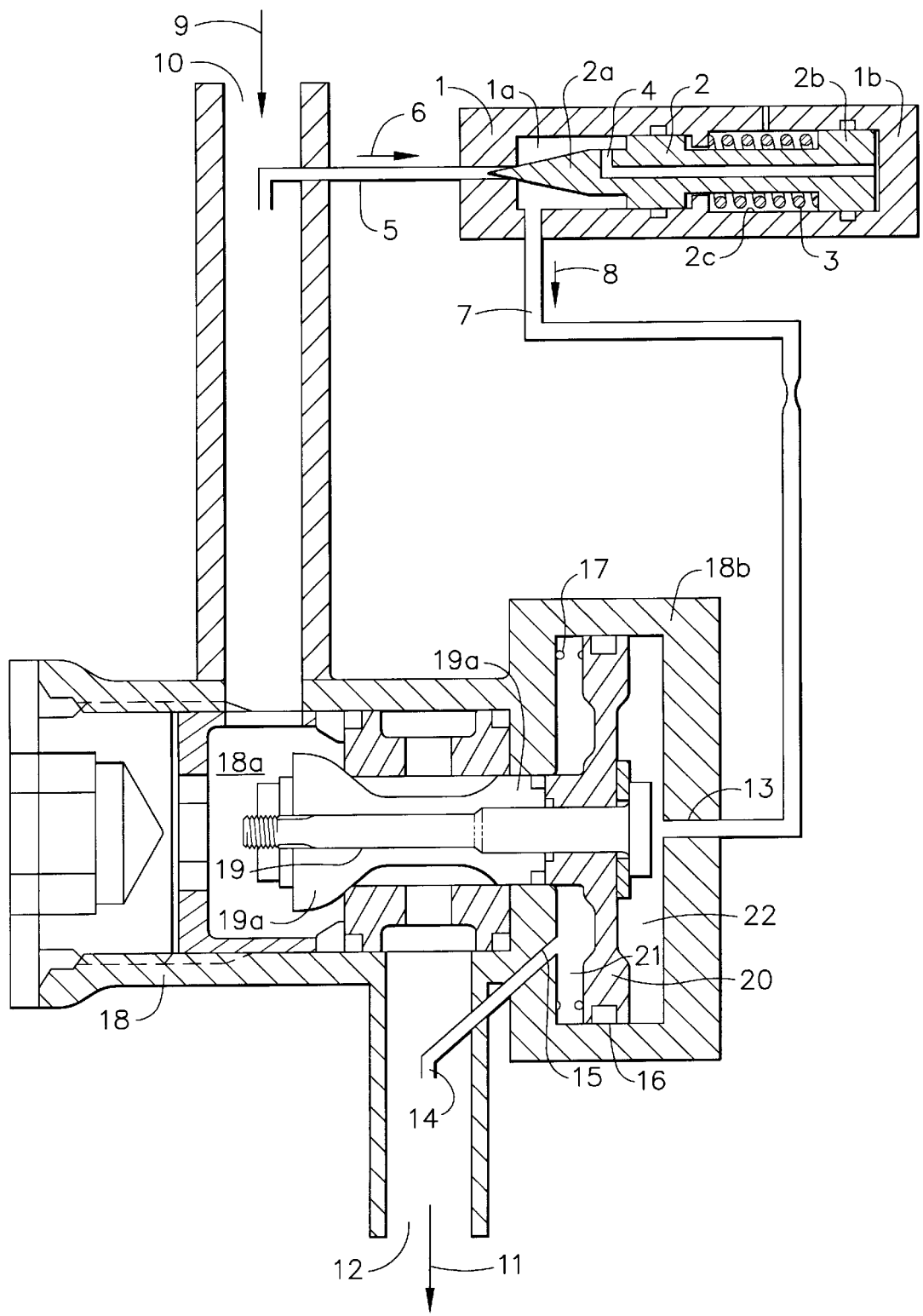
FIG. 1 is a drawing of our pressure regulator design.

Prior to the pressurization, the poppet 2 of the pilot regulator 1 is held wide open by a spring 3 or some other means. The warm gas 9 flowing into the main valve inlet 10 passes through the pilot inlet 5, and a pressure begins to build in the front end 1a of the pilot casing 1. As pressure builds, the fluid flows through the channel 4 within the pilot poppet 2, and a pressure builds in the back end 1b of the pilot casing 1. When the pressure reaches a predefined level (for instance, equal to the pressure exerted by the spring 3), the poppet front end 2a engages with the pilot casing inlet 5a, preventing further flow of fluid and pressure buildup.

Figure 2:
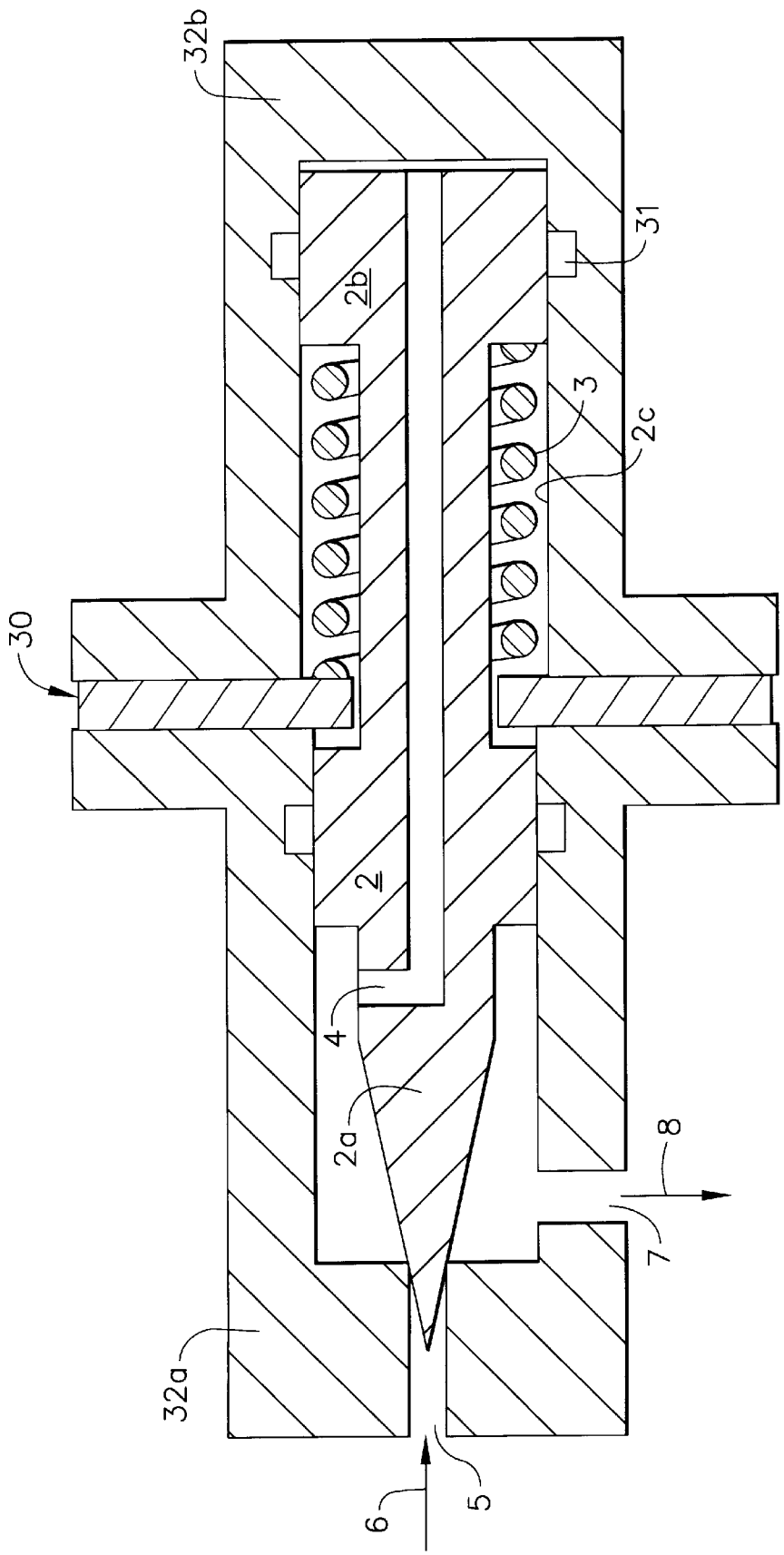
FIG. 2 is a drawing of the pilot regulator of the invention.
Figure 3:
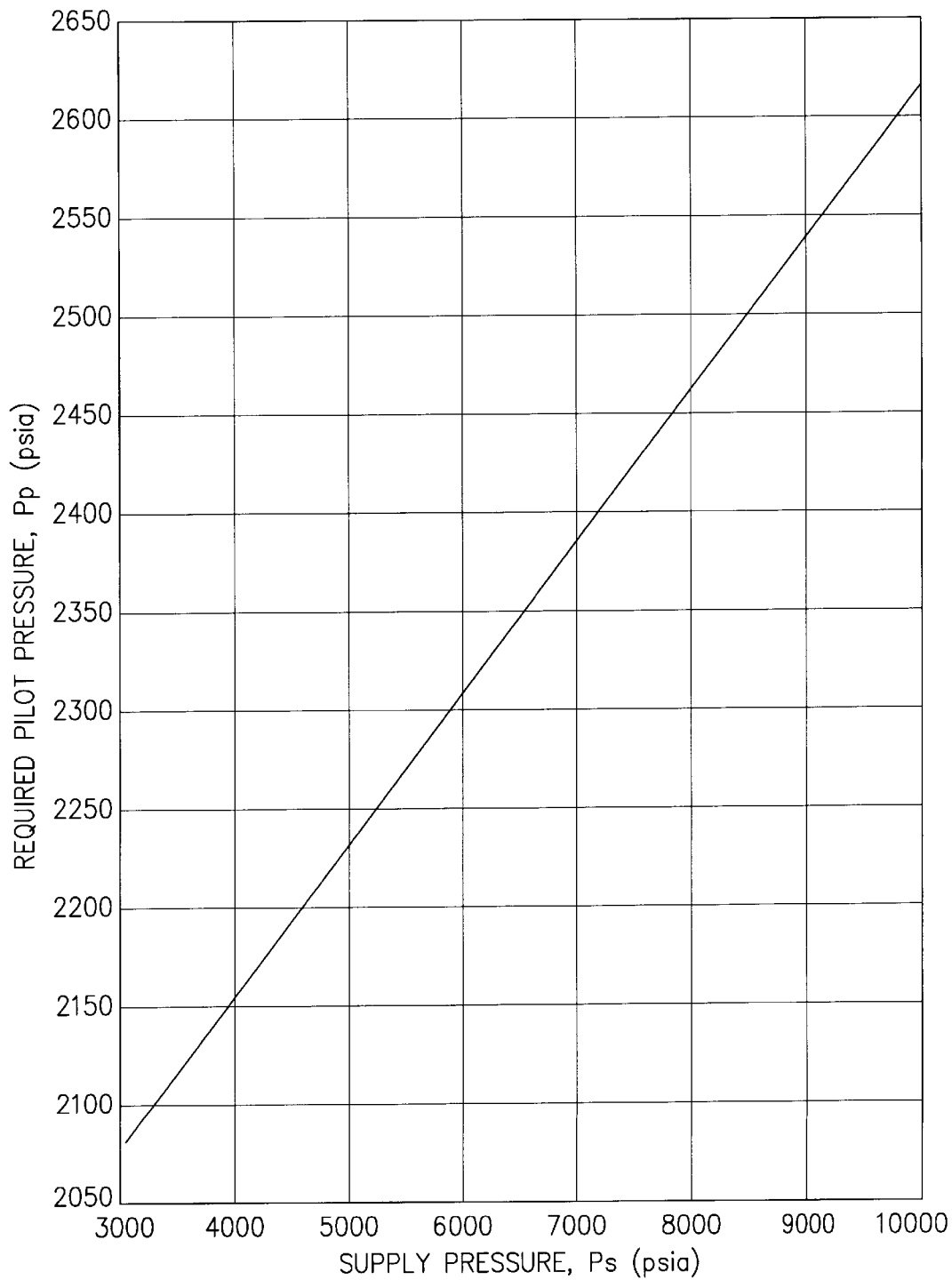
FIG. 3 is a graph showing the required pilot pressure for achieving a constant regulated pressure of 2,000 psia for the main regulator design of FIG. 1.
Figure 4:
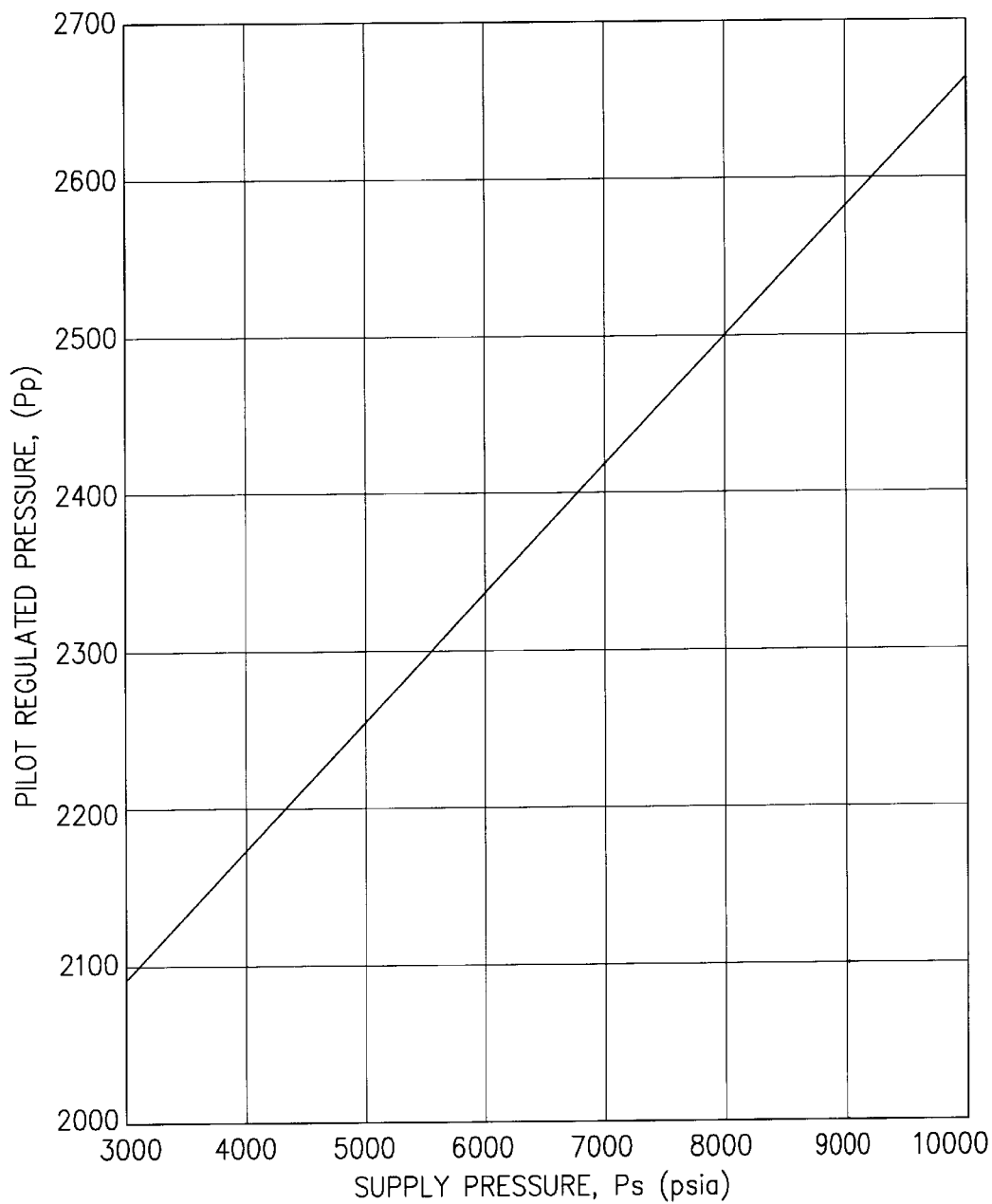
FIG. 4 is a graph showing the pilot output pressure prediction for achieving a constant regulated pressure of 2,000 psia for the main regulator design of FIG. 1 using the pilot regulator design of FIG. 2.

The pilot casing 1 is constructed so that the back end 1b is sealed from the front end 1a. For example, as shown in FIG. 2, the poppet 2 is fabricated from a single piece and slot 2c is cut into the poppet 2 as shown. The pilot casing 1 is actually a combination of three parts. The front end of the casing 1 consists of a half cylinder 32a with a flange, including the pilot inlet 5 and pilot outlet 7. The back end of the casing 1 consists of another half cylinder 32b with a flange. A spring retainer 30 is sandwiched between the half cylinders 32a, 32b. The spring retainer 30 can be made from two half disks for ease of assembly. A spring 3 or other pressure setting means is placed in the slot 2c of the poppet 2. In the case of a spring 3, one end rests on the spring retainer 30 and the other on the poppet 2. In this way, the spring 3 is isolated from the fluid, and is therefore not affected by the potentially high temperature of the fluid which could adversely influence the spring performance and longevity.

Prior to pressurization, and as the pressure in the pilot regulator 1 is building, the main poppet 19 is in the closed position, preventing flow through the main valve 18. The main poppet 19 may optionally be held in the closed position by a light spring 17 located in the back end 18b of the main casing 18. The main poppet 19 remains in the closed position until the pilot pressure reaches the preset value. This assures that the main poppet 19 will not slam on the main valve seat as the pressure builds up (which is a rapid process when this system is part of a gas generator device, for instance).

The main poppet 19 opens when the pilot pressure routed to the rear chamber 22 of the back end 18b of the main casing 18 (right side of the piston 20) reaches the preset value and overcomes the opposing force on the poppet 19

(the pressure force acting on the main poppet 19 from the main valve inlet 10 at the front end of the main casing 18a and/or the pressure in the front chamber 21 of the back end 18b of the main casing 18 (left side of the piston 20)). The opening of the main poppet 19 causes a pressurization in the main valve outlet 12, which is routed through the feedback 14 into the front chamber 21 of the back end 18b of the main casing 18. This feedback pressure opposes the pilot pressure present in the rear chamber 22, causing the main poppet 19 to close as the outlet pressure builds. As the pressure forces acting on the poppet 19 and piston 20 balance (pilot pressure in rear chamber 22, feedback pressure in front chamber 21, pressure in main valve inlet 10), an equilibrium regulated pressure (constant) in the outlet 12 is achieved.

By way of example, suppose the incoming fluid were a hot gas at 2,500° F. and 10,000 psia, and it was desired to have a constant output pressure of 2,000 psia. The pilot spring 3 would be selected to close off the pilot flow at between 2,090 psia and 2,660 psia. This would correspond to a pressure between 2,090 psia and 2,660 psia in the rear chamber 22 of the back end 18b of the main casing 18. This pressure would cause the piston 20 to move to the left, causing the main poppet 19 to open. This permits flow from the main regulator inlet 10 to its outlet 12, and pressure would build in the outlet 12. As pressure in the outlet 12 increases, the feedback 14 causes pressure to build in front chamber 21 of the back end 18b of the main casing 18, until it overcomes the pressure in the rear chamber 22 of the back end 18b of the main casing 18, causing the main poppet 19 to move to the right. As explained above, the forces work back and forth until an equilibrium is achieved, and output pressure is a constant 2,000 psia.

The overall pressure response of our invention is insensitive to upstream pressure. This is achieved by proportioning the pilot stage and main stage parameters, which when taken separately have finite pressure sensitivity, such that their pressure sensitivities cancel out.

The pilot stage output pressure is set higher than the main stage output pressure so that any pilot leakage will flow downstream, thus preventing over-pressurization. In addition, the only leakpaths from the high pressure inlet are at the pilot and main stage valve seats. This feature promotes good lockup protection against downstream over-pressurization.

Figure 5:
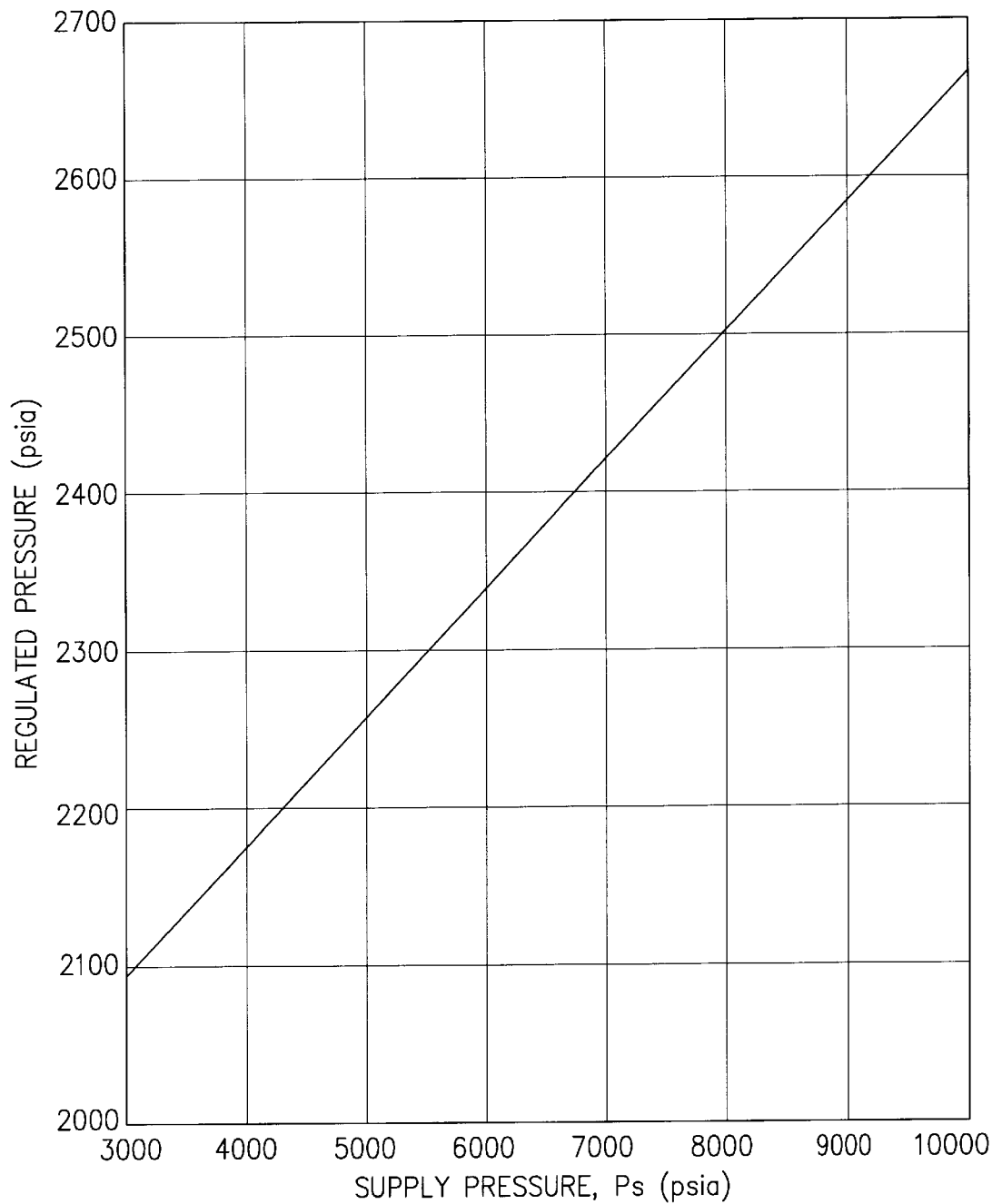
FIG. 5 is a graph showing the performance of the pilot regulator design as shown in FIG. 2 with a pilot regulator spring temperature of 75° F.
Figure 6:
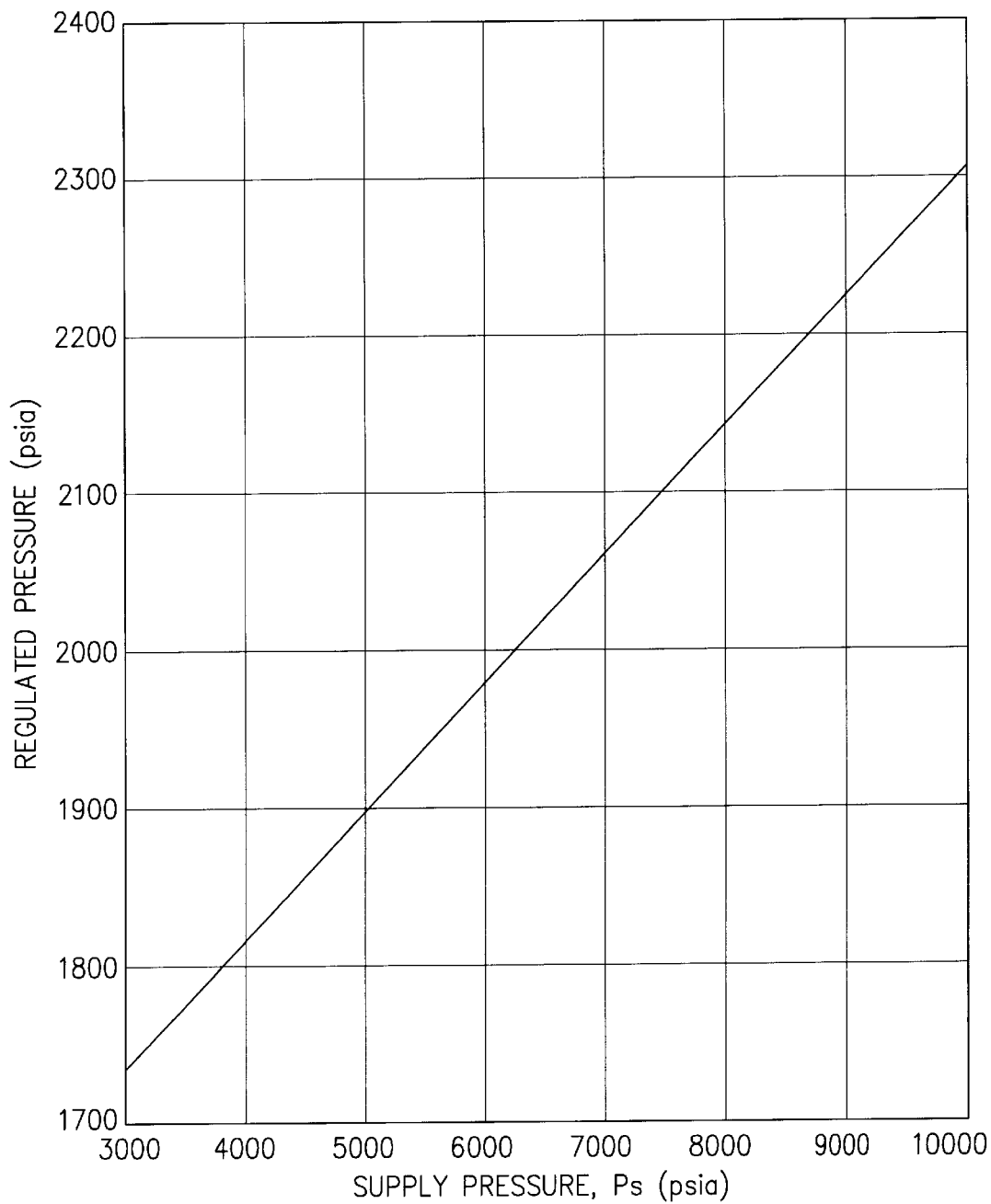
FIG. 6 is a graph showing the performance of the pilot regulator design as shown in FIG. 2 with a pilot regulator spring temperature of 700° F.

Although the pilot spring 3 is not directly exposed to the warm fluid being regulated, heat conduction and/or radiation may cause spring heating. FIGS. 5 and 6 are graphs comparing the pilot pressure output with spring temperatures of 75° F. and 700° F. respectively. Spring rate and preload decreases as spring temperature increases, and the pilot pressure and the regulated pressure output decreases as a result. For example, the regulated pressure flowing from the main valve output would decrease from 2,000 psia to 1,650 psia as the spring temperature increases from 75° F. to 700° F.

Figure 7:
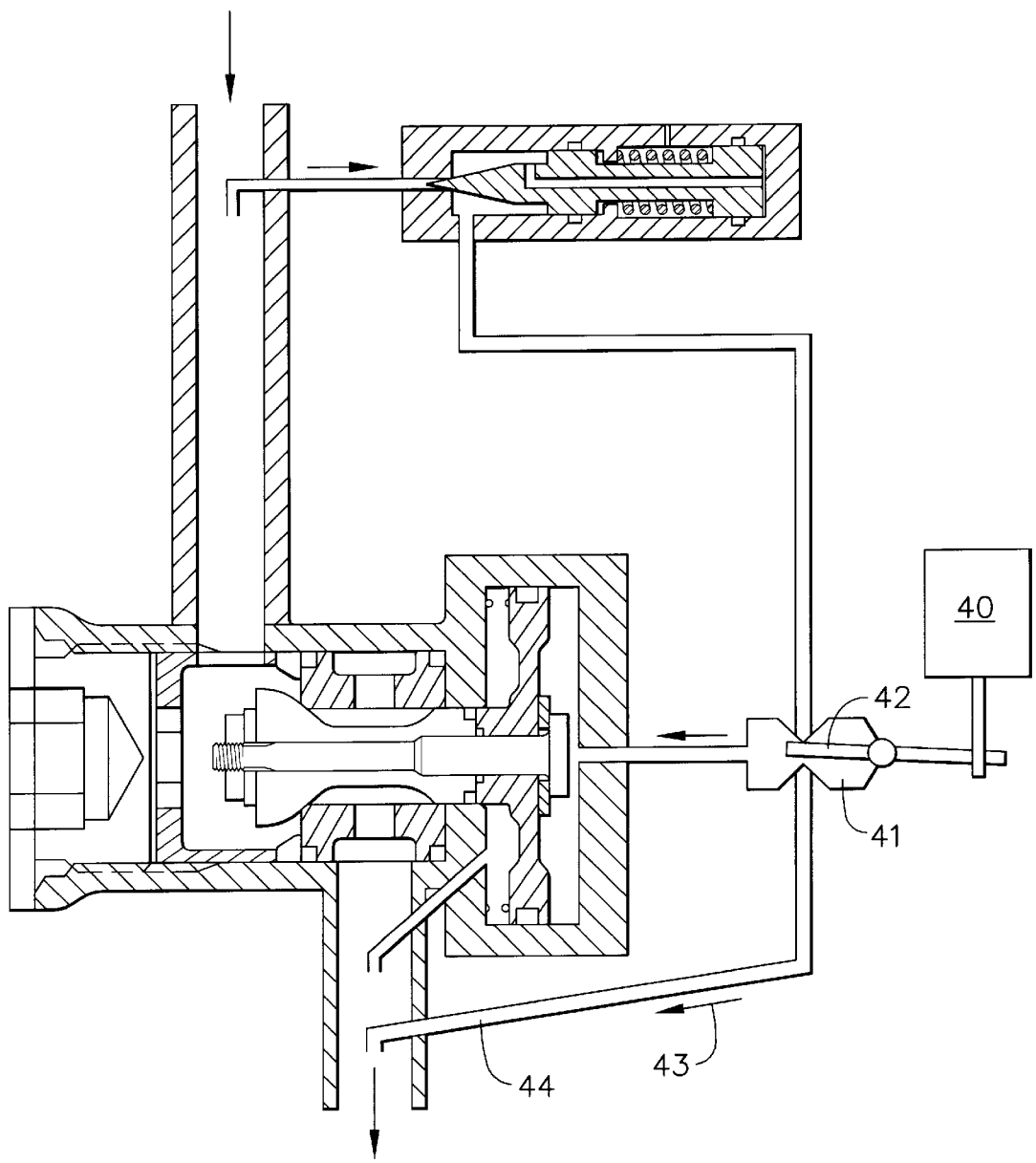
FIG. 7 is an alternate embodiment of our regulator, wherein pulse width modulation is used to control output pressure.

Referring to FIG. 7, by the addition of a solenoid 40 driven flapper nozzle valve 41 to our design, the regulated pressure 11 can be adjusted within a range of pressures by modulating the solenoid 40 driven flapper valve 41. The pilot pressure is modulated within a range of pressures by controlling the opening or closing duration of the flapper nozzle 42. Changing the pilot pressure translates into a change in pressure in the back chamber of the back end of the main regulator 22, which in turn changes the pressure at which the piston will open and close within the main valve 18. For example, if the flapper valve 41 is in the down position, the back end of the main regulator 22 sees the entire pilot pressure. As the flapper valve 41 position moves up, the pressure seen by the back end of the main regulator 22 decreases, and the excess pilot pressure is sent downstream to the main valve output 12 via ducting from the solenoid flapper valve 41. This means a change in the output pressure 11. As the solenoid driven flapper nozzle valve 41 is a proven design in the warm gas environment, this pulse width modulation controlled regulator is feasible. This design configuration can also be utilized for the spring temperature compensation if a fixed regulator output pressure is required. For example, a warm gas supply at about 10,000 psia and 2,500° F. can be regulated to an output pressure of anywhere between 0 psia and 2,000 psia when the pilot regulator is set up to provide a pressure of between 2,090 psia and 2,660 psia.

Although preferred embodiments are specifically illustrated and described herein, it will be appreciated that many modifications of the present invention are possible in light of the above teaching to those skilled in the art. It is preferred, therefore, that the present invention be limited not by the specific disclosure herein, but only by the appended claims.

We claim:

1. A pressure regulating valve for regulating a flow of a high-temperature, high-pressure fluid comprising:
   a main regulating valve; and
   a pilot valve;
   wherein said pilot valve comprises:
      a pilot casing having a front and back end;
      a pilot inlet for receiving a supply of fluid;
      a pilot outlet for releasing a supply of fluid;
      a slidably mounted pilot poppet having a front end and a back end, said pilot poppet front end seated in said pilot casing front end and said pilot poppet back end seated in said pilot casing back end, wherein said pilot poppet front end is fluidically isolated from said pilot poppet back end;
      said pilot poppet front end constructed to be capable of closing off said pilot inlet;
      said pilot poppet defining an internal channel that permits fluid flow from the front end of said pilot poppet to the back end of said pilot poppet; and
      a mechanical spring for holding said pilot poppet in an open position until a predefined pressure within said pilot casing is reached, said pilot poppet spring located in said pilot casing back end and operatively connected to said pilot poppet and said pilot casing, said spring fluidically isolated from said pilot casing front end so that said spring does not directly contact the flow being regulated;
   wherein said main regulating valve comprises:
      a main inlet for receiving a supply of fluid;
      a main outlet for releasing a supply of fluid;
      a pilot pressure inlet;
      a main valve seat;
      a main poppet having a front end and a back end;
      a main valve pressure responsive means having a front end and a back end; and
      means for receiving feedback pressure from said main valve outlet;
      wherein
         said main valve pressure responsive means is seated in said main valve casing back end thereby defining a front chamber and a back chamber, said main valve pressure responsive means having a circumferential dynamic seal that fluidically isolates said front chamber from said back chamber, said main valve pressure responsive means front end operatively connected to said main poppet back end, said connection fluidically isolating said main valve front end from said main valve back end so that said circumferential dynamic seals are not directly exposed to the pressure of the flow being regulated;

said feedback pressure receiving means having one end open to said main valve outlet and the other end open to said front chamber;

said pilot pressure inlet located in said main valve casing back end permitting fluid connection between said pilot outlet and said back chamber;

wherein said pilot receiving inlet is in fluid connection with said main inlet.

2. The device of claim 1 wherein said main valve front chamber is at a lower pressure than the pressure present in said main valve inlet.

3. The device of claim 1 wherein said main valve front chamber is at one-fifth of the pressure than the pressure present in said main valve inlet.

4. The device of claim 1, further comprising a flapper nozzle valve comprising:

a solenoid;

a flapper valve operatively connected to said pilot regulator output;

a flapper valve output operatively connected to said main valve regulator output; and a flapper nozzle within said flapper valve positionable anywhere from closing off flow to said flapper valve output to closing off flow from said pilot regulator output.

5. The device of claim 1 where said supply of fluid flowing through said main valve inlet is at a pressure of about 10,000 psia and 2,500° F., and said supply of fluid flowing out of said main valve outlet is at a pressure of about 2,000 psia.

6. The device of claim 3 where said supply of fluid flowing through said main valve inlet is at a pressure of about 10,000 psia and 2,500 ° F., and said supply of fluid flowing out of said main valve outlet is adjustable from a pressure of about 2,000 psia down to a pressure of 0 psia.

* * * * *